Oct. 23, 1934.   R. D. ELLIOTT   1,978,254
FILTRATION PROCESS AND APPARATUS
Filed March 9, 1932
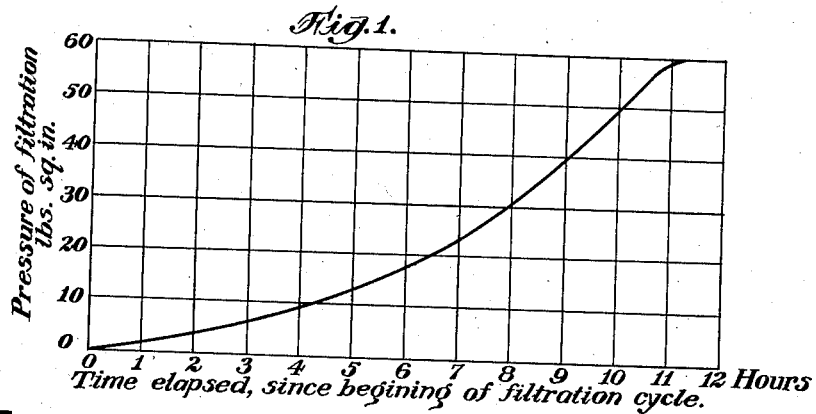
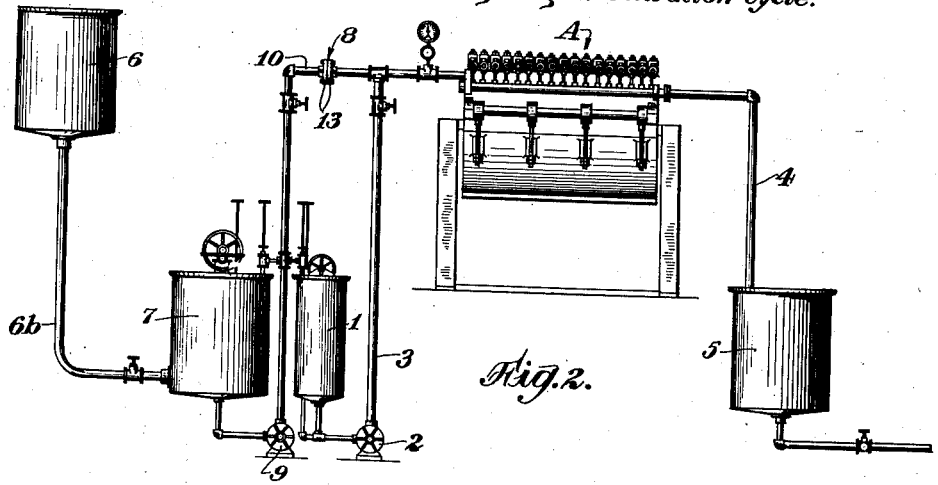
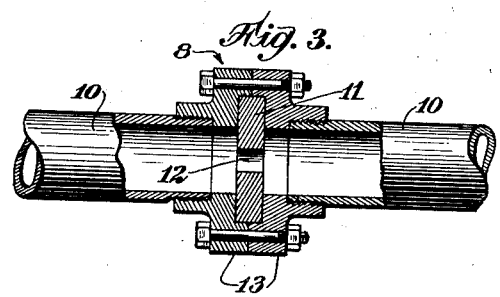
INVENTOR
Roy D. Elliott.
BY
ATTORNEY Patented Oct. 23, 1934

1,978,254

UNITED STATES PATENT OFFICE 1,978,254

FILTRATION PROCESS AND APPARATUS

Roy D. Elliott, New York, N. Y., assignor to Johns-Manville Corporation, New York, N. Y., a corporation of New York Application March 9, 1932, Serial No. 597,695

6 Claims. (Cl. 210—177)

This invention relates to a filtration process and apparatus. The invention pertains especially to the clarification of turbid liquids with a filter-aid in a pressure filter in such manner that sudden fluctuations in pressure are avoided. A preferred embodiment of the invention is the filtration of raw sugar solutions of high-density with calcined diatomaceous earth filter-aid by a process which comprises pumping a mixture of the sugar solution and the diatomaceous filter-aid through a feed line provided with a constriction into a pressure filter.

It is common practice to filter turbid liquids with a filter-aid. In such filtrations it is conventional to mix a small proportion of filter-aid into the turbid liquid or mixture that is to be filtered, force the resulting mixture through a feed pipe line and into a pressure filter, and to collect a clarified effluent. The presure of filtration is commonly increased as the filtration cycle progresses. Thus, it is not uncommon to increase the filtration pressure stepwise during early stages, say, the first half of the filtration cycle, and then to maintain the filtration pressure at the selected maximum for the remainder of the cycle.

Clarification by pressure filtration with a filter-aid is illustrated by the filtration step in a conventional process of refining raw cane sugar. Raw cane sugar is affined by washing with water, whereby there is produced an affination syrup of approximately 80% purity and washed sugar of approximately 99% purity, the term "purity" being used to represent the percentage of actual sugar to total solids. The filtration of these products after neutralization with lime is made in the presence of a filter-aid, at a density of 45 to 60° Brix usually approximately 54°, for the affination syrup and at 54 to 64° Brix usually approximately 60°, for the washed sugar. The degrees Brix referred to herein are corrected to normal temperature and represent parts by weight of total solids to 100 parts of solution. The filter-aid may be a finely divided, relatively pure diatomaceous earth, such as the commercial product sold and used for filtration purposes or calcined finely divided diatomaceous earth filter-aid, made as described in United States Patent 1,477,394 to Thatcher or preferably made by calcination of finely divided diatomaceous earth in the presence of chemicals adapted to flux clay as described in United States Patent 1,502,547 to Calvert, Dern, and Alles. The proportion of filter-aid used may be 0.15 to 2.0%, suitably 0.3%, of the weight of raw sugar to be filtered. The exact proportion of filter-aid to sugar to be filtered will vary somewhat with the filterability or filtration properties of the sugar. In many cases, filter-aid is used in the proportion of approximately 0.15 to 0.2% of the weight of washed sugar. The mixture of filter-aid with the concentrated aqueous sugar solution is pumped through a pipe line to a filter-press or pressure filter, of which the Sweetland suspended leaf type is perhaps the mose widely used in the United States. These filters are made with various areas of filtering surface. Thus, a usual Sweetland pressure filter contains approximately 1,044 square feet of filtering area. In order to pre-coat the cloths with which the various leaves of the pressure filter are equipped, there may be pumped through the filter, at the start, a slurry of sugar solution containing a relatively high proportion of filter-aid. Or, the pre-coating may be made in another conventional manner, or even omitted entirely, at the choice of the operator. However, if the pre-coating is not resorted to before the main batch of liquid to be filtered is supplied to the press, there is an appreciable period at the beginning of the filtration cycle during which the effluent from the filter may be quite turbid. The liquid and the filter-aid mixture that is to be filtered is supplied to the pressure filter at a low pressure at the start of the cycle, as, for example, at 1 to 5 pounds per square inch pressure, and the pressure is increased, stepwise, during the filtration cycle, up to a selected maximum which may be approximately 60 pounds per square inch. It is common practice to pump the mixture into the filter-press and to have a battery of, say, 4 presses connected in parallel to a header, so that one pump, through this header, feeds all the presses.

This conventional filtration process has now been found to show certain disadvantages. Thus, the pressure on a press may fluctuate more or less suddenly. For example, ⸱ ʰh several presses being fed by the same pump, the closing down of one press, cleaning, and then connecting it, as a fresh press to the line, may cause a sudden pronounced effect on the pressure of liquid in the other presses fed by the same pump. Also a pump may work somewhat irregularly, and it is known that a pump of the reciprocating type has more or less of a pounding action upon the filter cake in a press being fed by that pump, unless special precautions are taken to minimize the effect of the intermittent pulsations from the pump. Also, there is a tendency for liquids to be pumped into the filter at too high a pressure at the beginning of the cycle, with a consequent rushing of highly turbid material through the filter cloths. Further, it has been found that pressure is usually built up in the filter, to the maximum desired, too rapidly for the most satisfactory operation of the press.

If the pressure obtaining in the pressure filter at several times were plotted against the time elapsed since the beginning of the filtration cycle, it would be found in many cases that the resulting graph would show stepwise increases in pressure and would resemble somewhat the profile of an ordinary stairs with, however, many irregularities representing irregular fluctuations consisting of sudden pronounced increases and/or decreases in the pressure of filtration. It is also true that these stepwise increases in pressure and the irregular and sudden fluctuations affect adversely not only the rate of filtration, as judged by the results for a complete filtration cycle, but also the degree of clarity of the filtrate. Thus, a sudden substantial increase in the pressure of filtration is apt to produce turbidity of the filtrate. Automatic mechanical regulations of pressure are expensive and complicated.

Objects of the present invention are, to provide a simple process and apparatus adapted to increase the average rate of pressure filtration of turbid liquids mixed with filter aids, to make possible a longer filtration cycle, and/or to produce a filtrate of higher concentration of the valuable ingredient or of improved quality. Other objects and advantages will appear from the detailed description that follows.

The invention is illustrated by the drawing in which

Fig. 1 shows a graph of a suitable relation of the pressure of filtration to the stage of the filtration cycle. While the pressures are plotted as pounds and the stage in the filtration cycle is expressed as hours of elapsed time after the beginning of the filtration, these units may be replaced by arbitrary units. However, the graph and the units indicated in Fig. 1 represent appropriate conditions for many commercial filtrations and particularly for the filtration of 60° Brix raw sugar solutions with calcined diatomaceous earth filter-aid.

Fig. 2 shows a side elevation of a typical filtration assembly.

Fig. 3 shows in more detail a longitudinal section, with parts broken away for clearness of illustration, of a preferred mode of inserting a narrow portion into the feed line through which the mixture to be filtered is delivered under pressure to the filter.

Fig. 4 shows a longitudinal section, with parts broken away for clearness of illustration, of a modification of the narrow portion of the feed line.

In the various figures, like reference characters indicate like parts. Thus, 1 indicates a small tank and equipment for mixing a high proportion of filter-aid into a liquid for pre-coating purposes. This liquid is delivered by the centrifugal pump 2 through pipe line 3, suitably of 4 inches internal diameter, to the pressure filter indicated generally at A and provided suitably with a total of approximately 1,044 square feet of filtering area. The effluent passes through the pipe line 4 to a filtrate receiving tank 5 provided with conventional draw-off at the bottom. The tank 6 is the container in which the cloudy or turbid liquid to be filtered is stored. This tank communicates, by a discharge pipe line 6b, with the mixing tank 7 in which the filter-aid is mixed into the liquid. The resulting mixture passes through the pipe line to the centrifugal pump 9 and through the pipe or feed line 10, suitably of 4 inches internal diameter, provided with pressure controlling means 8 comprising flanges 13 supporting between them a disk 11 with central circular perforation 12 suitably 0.8 inch in diameter, into the filter press A. The effluent again passes out through pipe line 4, suitably after the filtrate of pre-coating solution has been withdrawn from the receiving tank 5.

Two types of constrictions of narrow portions of the pipe line are illustrated in some detail in Figs. 3 and 4, both of which are longitudinal sections, with parts broken away for clearness of illustration, of the constrictions and adjacent portions of the feed line. Thus, there is shown in Fig. 3 two adjacent ends of the feed line 10, provided with screwed-on flanges 13, between which flanges is maintained the disk 11. In Fig. 4 is shown a modification in which two ends of the pipe line 10 are equipped with reducing connections 14, between which reducers at their narrow ends is inserted a narrow pipe 15 of short length, suitably pipe of 1 inch internal diameter and length not greater than 18 inches.

In general, it has been found satisfactory to have the narrow portion of the pipe line offer substantial invariable, resistance to the flow of liquid therethrough, and suitably a resistance approximately equal to that given by a disk with a central circular perforation of 0.8 inch diameter for each 1,044 square feet of filtering area served by liquid passing through the narrow portion of the pipe line. If the filtering area is larger, then a constriction of larger cross section may be used. If the filtering area is smaller, then a constriction or narrow portion of smaller area of opening is satisfactory. The narrow portion of the pipe line should be adapted, for example, to offer resistance to flow of liquid therethrough approximately equal to that offered by a flat disk with a central circular perforation having an area of cross section equal approximately to three-millionths of the filtering area of the pressure filter being fed by liquid passing through the said narrow portion. This means that for every one miillion square inches of filtering area being served through a given pipe line, the narrow portion or constriction in the pipe line should have an opening of area of approximately 3 square inches. In other cases, it has been found that the size of opening in the constriction may be increased somewhat, as, for example, to six-millionths of the filtering area of the pressure filter. In general, the area of opening of the narrow porton or constriction in the feed line for the purposes set forth should not be less than approximately one-millionth or greater than twelve-millionths of the filtering area of the filter in the system. The filtering area of a pressure filter, such as a plate and frame or suspended leaf type, is calculated as the total area of cloth or other permeable material used to cover the filter leaves or plates in the filter, before the filtration is started.

It will be understood that the solution to be filtered may be adjusted to suitable temperature, density, and degree of acidity or alkalinity (pH value) and the filter-aid added either before or after charging into the mixing tank 7. At any rate after the temperature, density, and reaction have been adjusted and the filter-aid added, the liquor is thoroughly agitated by any desirable means and then pumped by means of pump 9 through the feed line 10 and the opening 12 into the filter A.

The constriction or narrow portion of the feed line offers considerable resistance to the flow of liquid or a suspension of solids in liquids through the line and is adapted to prevent sudden pronounced or undesirably rapid fluctuations of pressure within the filter at any stage of the filtration cycle and to prevent the pressure within the filter from reaching the selected maximum during an early stage of the filtration cycle.

The invention is not limited to the above explanation or to any theory to explain the results obtained. The results obtained are surprisingly satisfactory. An example of the results that have been obtained in the filtration of a concentrated, 60° Brix raw sugar solution with a filter assembly comprising a narrow portion of 1 inch internal diameter in a 3 inch feed line, follows.

Using 0.3% calcined diatomaceous earth filter-aid, made as described in the above mentioned patent to Calvert, Dern, and Alles, and hand regulation of the pressure, that is, with no constriction or narrow portion of constant area of opening in the feed line, there was obtained, in a 12-hour filtration cycle, approximately 40 tons of filtered sugar calculated on the dry basis. In a parallel series of tests, in which there was similarity of operation, as far as could be determined, with the exception that the attempted hand regulation of pressure was substituted by inserting in the pipe line feeding the filter press a narrow portion of 1 inch internal diameter, there was obtained 70 to 80 tons of filtered sugar, on the dry basis, per press in a 12 hour cycle. In these tests the pump used was capable of giving 70 pounds pressure per square inch and the pressure was actually built up to 60 pounds per square inch, towards the end of the 12 hours of filtering time. In additional detailed tests, it has been found that a Vallez pressure filter with 4 inch feed line, operated in conventional manner at a maximum pressure of 45 pounds, with the calcined diatomaceous earth filter-aid, has given an average filtrate equal to 27 tons dry weight of sugar, when there was no constriction of constant area of cross section in the feed line, as compared to 85 tons per cycle with the same press supplied with liquor through a feed line provided with a narrow portion having a central circular perforation of 0.87 inch internal diameter. It should be pointed out in this connection that fewer cycles were run per day when 85 tons were obtained per cycle than when 27 tons were obtained without the constriction in the feed line. The total tonnage output per day was approximately the same with and without the constriction. With the constriction, however, there was less manual work required, due largely to the smaller number of cycles run, and there was used only 6.2 pounds of the diatomaceous earth filter-aid per ton of sugar melted (dissolved), as compared to 8.3 pounds when no constriction in the pipe line was used.

In general, it has been found desirable to make the opening in the narrow portion of the feed line to the filter of such size that the rate of increase in pressure at which the liquid is being filtered shall not exceed 5 to 10 pounds per square inch per hour and that the increase shall be not stepwise but substantially continuous, in infinitesimal increments. Thus, if the maximum pressure of filtration selected is 60 pounds per square inch, this pressure may be reached in something less than the total length of the filtration cycle. For example, if the filtration cycle is to be 12 hours, then the maximum filtration pressure may be reached approximately in 10 hours. While the preferred rate of increase of pressure varies somewhat with the kind of liquid being filtered, it is desirable that the maximum pressure should not be reached during an early stage of the filtration cycle and usually not during the first half of the filtration cycle, particularly in the filtration of impure cane sugar solutions. In fact, a preferred embodiment of the invention is to force the liquid to be filtered, through a pipe line having a constriction of such area of cross section of opening that the maximum pressure may not be reached in the filter press before the last quarter or even the last sixth of the filtration cycle. Sudden pronounced fluctuations of pressure, either up or down, are to be avoided.

It will be observed that the opening in the narrow portion of the pipe line supplying liquor to the pressure filter has a constant and invariable cross section. The exact size of the opening of invariable cross section which operates best with the particular equipment and filtration process in use in a given factory may be determined by a few simple experiments. Thus, for a pressure filter of 1,044 square feet filtering area, there may be tried, in turn, constrictions with circular openings of diameters, 1½ inches, 1 inch, and 0.8 inch. The size giving the best result is selected. With slowly filtering liquids, smaller openings, say half-inch, may be used.

It has been indicated that the optimum size of opening in the narrow portion of the pipe line will depend somewhat on the equipment in use. When the pump delivering liquid through the pipe line is in good condition and gives a relatively high pressure, as, for example, 70 pounds per square inch, then the optimum size of opening in the narrow portion of the pipe line is smaller than when the pump is of poor quality and gives only a low pressure. In general, the size of opening in the narrow portion of the feed line should be determined partly by the filterability of the sugar to be clarified and by the length of filtration cycle desired. Thus, the size of opening should be relatively small when it is desired to have a long filtration cycle, with a minimum ratio of "dead" time (for cleaning filters, etc.) to "live" time or actual filtering time.

While the calcined diatomaceous earth filter aid and particularly that made in accordance with the patent to Calvert, Dern, and Alles is preferred at this time for use in the process described, other filter aids may be used. For some purposes there may be used finely divided diatomaceous earth that has not been calcined. Also, in some cases, and particularly in cases where thorough clarification is not desired, there may be used an entirely different filter aid, as, for example, a special grade of wood pulp or well disintegrated amphibole asbestos.

There may be used a different type of filter, as, for example, a Vallez pressure filter provided with filter leaves that are rotated slowly during the progress of the filtration.

The invention has been illustrated particularly as applied to the filtration of sugar solutions and especially 60° Brix solutions of impure or raw cane sugar. Other concentrations and kinds of solutions may be filtered. Thus, solutions comprising beet sugar, corn sugar, pectin, chilled lubricating oil mixed with wax, and gelatin solutions, for example, may be filtered in accordance with the present invention. However, the invention is at present most useful in the filtration process in refineries for raw cane sugar.

Surprising as it may appear, the filtration of high density sugar liquors in accordance with the present invention, as compared to previously used processes of filtrations at a lower density, causes no substantial decrease in the rate of filtration as measured by the pounds of sugar in the filtrate per square foot of filtering areas. Typical results of high density filtration are illustrated in the following example of operations on a commercial scale. Using washed cane sugar of approximately 99 per cent purity with 4 pounds of calcined diatomaceous earth filter-aid, made in accordance with the above mentioned patent to Calvert, Dern, and Alles, per ton of washed sugar solids, and filtering at a density of 67° Brix and a temperature of 80° centigrade, with minimized fermentation during the affining process, and with control of the pressure of filtration, whereby sudden, pronounced fluctuations are minimized and the selected maximum pressure of filtration is not attained during an early stage of the filtration cycle, as, for example, not until the last quarter of the cycle, there has been obtained in a period of 24 hours 180 tons of actual sugar in the filtrate from pressure filters having a total filtering area of 1,044 square feet.

With the improved filtration process and equipment, other solutions may be filtered commercially at higher densities than were considered formerly to give commercially satisfactory rates of filtration. Thus, it has been found that affination syrup from sugar refining, may be filtered at a concentration of 61 to 64° Brix, and suitably at a concentration not lower than 63°. It has been found also that the concentration at which sugar liquor may be filtered satisfactorily can be increased above the concentration stated, as the filterability of the sugar in the solutions is increased. Solutions of washed cane sugar of 99 per cent purity may be filtered at a commercially satisfactory rate when the concentration of the sugar solution is 66 to 68° Brix and suitably approximately 67° Brix.

In making the filtrations of sugar solutions at the abnormally high densities and satisfactory rates, precautions should be taken to avoid lowering the filtration properties or filter-ability of the sugar, as by minimizing fermentation and also the production of undesirable by-products formed, as lime, added in neutralization, is allowed to remain in contact with the sugar solution for too long a time before filtration.

The term "variable pressure" as used in the claims, indicates the condition in which the pressure varies during the filtration cycle, as, for example, from a low pressure initially to a relatively high pressure at the end of the cycle.

It will be understood that the sugar solution of type used in the above examples is very viscous and contains slimy impurities adapted to be packed together to form a relatively impervious filter cake. The process and apparatus are especially useful in filtering turbid liquid mixtures containing such suspended impurities.

The details that have been given are for the purpose of illustration, not limitation, and many variations may be made without departing from the scope of the invention. Therefore, it is intended that the invention shall be limited only by the terms of the claims, interpreted as broadly as is consistent with novelty over the prior art.

What I claim is:

1. The clarification of a turbid liquid containing slimy suspended matter adapted to form a relatively impervious filter cake by a process which comprises making a mixture of the liquid with a filter-aid and forcing the mixture under variable pressure through a feed line into a pressure filter, the said feed line including a constricted portion of invariable area of cross section equal in area to not less than approximately one-millionth and not more than twelve-millionths of the filtering area of the pressure filter, the said portion offering substantial resistance to flow of liquid therethrough and being adapted to prevent sudden pronounced fluctuations of pressure within the filter at any stage of the filtration cycle.

2. The clarification of solutions of washed cane sugar by a process which comprises forming an aqueous solution of the sugar of density substantially above 60° Brix, admixing therewith a filter-aid including diatomaceous earth calcined in finely divided form, and forcing the resulting mixture under pressure through a feed pipeline to a pressure filter, the said feed line comprising a constricted portion of invariable area of cross section equal in area to not less than approximately one-millionth and not more than twelve-millionths of the filtering area of the pressure filters, adapted to minimize fluctuations of pressure within the filter and to prevent the pressure within the filter from reaching the selected maximum during an early stage of the filtration cycle.

3. The clarification of solutions of washed cane sugar by a process which comprises forming an aqueous solution of the sugar of density of the order of approximately 67° Brix, admixing therewith a filter-aid including diatomaceous earth calcined in finely divided form and in the presence of a chemical adapted to flux clay, and forcing the resulting mixture under pressure through a feed pipeline to a pressure filter, the said feed line comprising a constricted portion of invariable area of cross section equal in area to approximately three-millionths to six-millionths of the area of the pressure filter.

4. The clarification of solutions of affination syrup in sugar refining by a process which comprises forming an affination syrup, admixing therewith a filter-aid including diatomaceous earth calcined in finely divided form, and forcing the resulting mixture under pressure through a feed pipeline to a pressure filter, the said fed line comprising a constricted portion of invariable area of cross section equal in area to not less than approximately one-millionth and not more than twelve-millionths of the filtering area of the pressure filter, adapted to minimize fluctuations of pressure within the filter and to prevent the pressure within the filter from reaching the selected maximum during an early stage of the filtration cycle.

5. Filtration equipment comprising a pressure filter and a feed line through which material to be filtered is supplied under pressure to the filter, the said feed line including a constricted portion, of invariable area of cross section equal in area to not less than approximately one-millionth and not substantially more than twelve-millionths of the filtering area of the pressure filter.

6. Filtration equipment comprising a pressure filter of established filtering area, a feed line thereto, means for delivering material to be filtered through the feed line under variable pressure to the filter, and a constricted portion of the feed line provided with an opening of a constant area of cross section, the area of the said opening being three-millionths to six-millionths of the filtering area of the pressure filter.

ROY D. ELLIOTT.